(12) United States Patent
Koste et al.

(10) Patent No.: US 8,503,599 B2
(45) Date of Patent: Aug. 6, 2013

(54) OPTICAL GAMMA THERMOMETER

(75) Inventors: Glen Peter Koste, Niskayuna, NY (US); Hua Xia, Altamont, NY (US); Boon Kwee Lee, Clifton Park, NY (US)

(73) Assignee: General Electric Company, Niskayuna, NY (US)

( * ) Notice: Subject to any disclaimer, the term of this patent is extended or adjusted under 35 U.S.C. 154(b) by 1367 days.

(21) Appl. No.: 12/259,931

(22) Filed: Oct. 28, 2008

(65) Prior Publication Data

US 2010/0104060 A1    Apr. 29, 2010

(51) Int. Cl.
*G21C 17/00* (2006.01)

(52) U.S. Cl.
USPC ............................. 376/247; 376/248; 376/244

(58) Field of Classification Search
USPC .................................................. 376/244–248
See application file for complete search history.

(56) References Cited

U.S. PATENT DOCUMENTS 5,015,434 A * 5/1991 Wimpee et al. ............... 376/254
7,336,862 B1 * 2/2008 Xai et al. .......................... 385/12

OTHER PUBLICATIONS

Jensen et al., "Measurement of nuclear reactor local heat rates by optical fiber infrared emission", Communications, Opt. Eng. 36(8), 2353-55 (Aug. 1997) (Society of Photo-Optical Instrumentation Engineers).*
Grattan et al., "Fiber optic sensor technology: an overview", Sensors and Actuators 82 (2000) 40-61 (Elsevier).*
Alfeeli et al.; "Behavior of Random Hole Optical Fibers under Gamma Ray Irradiation and Its Potential Use in Radiation Sensing Applications", Sensors, May 24, 2007, pp. 676-688.*
Tormen et al.; "Randomly Sampled Apodization in Bragg Gratings", Apr. 2006, Journal of Lightwave Technology, vol. 24, No. 4, pp. 1896-1902.*

* cited by examiner

*Primary Examiner* — Timothy A Brainard
(74) *Attorney, Agent, or Firm* — Ann M. Agosti

(57) ABSTRACT

An optical gamma thermometer includes a metal mass having a temperature proportional to a gamma flux within a core of a nuclear reactor, and an optical fiber cable for measuring the temperature of the heated metal mass. The temperature of the heated mass may be measured by using one or more fiber grating structures and/or by using scattering techniques, such as Raman, Brillouin, and the like. The optical gamma thermometer may be used in conjunction with a conventional reactor heat balance to calibrate the local power range monitors over their useful in-service life. The optical gamma thermometer occupies much less space within the in-core instrument tube and costs much less than the conventional gamma thermometer.

11 Claims, 8 Drawing Sheets

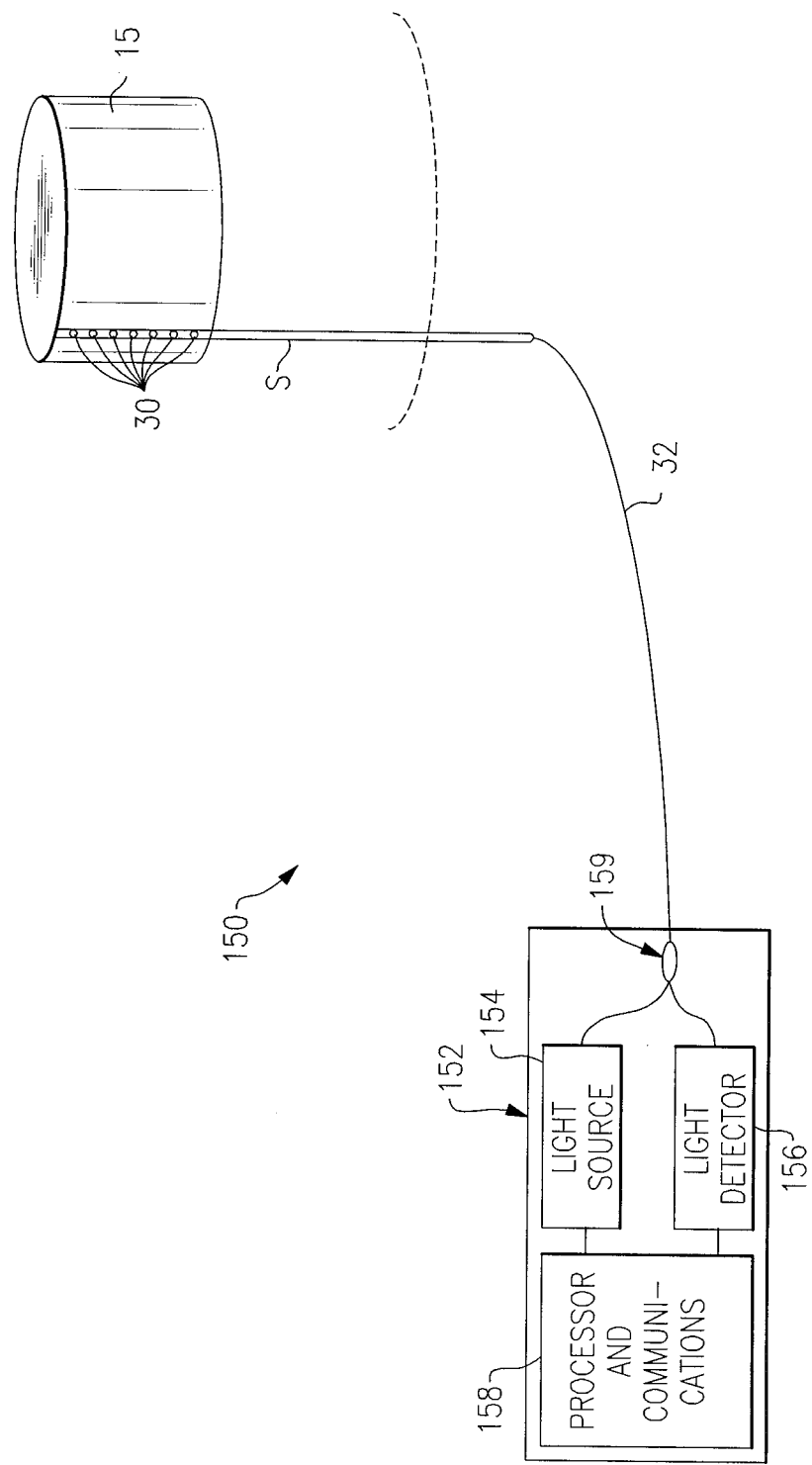

OPTICAL GAMMA THERMOMETER

STATEMENT REGARDING FEDERALLY SPONSORED RESEARCH & DEVELOPMENT

This invention was made with Government support under contract number DE-FC07-07ID14778 awarded by the United States Department of Energy. The Government has certain rights in the invention.

BACKGROUND OF THE INVENTION

1. Field of the Invention

In general, the invention relates to the monitoring of thermal neutron flux within a nuclear reactor, and in particular to an optical gamma thermometer for use in a monitoring string having a local power range monitor in which the measured temperature from the optical gamma thermometer, in conjunction with a steady-state heat balance, is used to calibrate the local power range monitor during its in-service lifetime.

2. Description of the Related Art

In the nuclear reaction interior of conventional boiling water reactors (BWR), it is possible to monitor the state of the reaction by either the measurement of thermal neutron flux, or alternatively gamma ray flux.

Thermal neutron flux is the preferred measurement. As it is directly proportional to power and provides for a prompt (instantaneous) signal from a fission chamber. The alternative measurement of gamma radiation does not have the required prompt response necessary for reactor safety requirements. Consequently, gamma radiation as measured by gamma thermometers is not used to measure and immediately control the state of a reaction in boiling water nuclear reactors.

Boiling water reactors have their thermal neutron flux monitored by local power range monitors, otherwise known as a local power range monitoring (LPRM) system. These local power range monitors include a cathode having fissionable material coated thereon. The fissionable material is usually a mixture of U235 and U234. The U235 is to provide a signal proportional to neutron flux and the U234 to lengthen the life of the detector. The thermal neutrons interact with the U235 and cause fission fragments to ionize an inert gas environment, typically argon, in the interior of the conventional local power range monitor. There results an electric charge flow between the anode and cathode with the resultant DC current. The amperage of the DC current indicates on a substantial real time basis the thermal neutron flux within the reactor core.

The boiling water reactor local power range monitors are inserted to the core of the reactor in strings. Each string extends vertically and typically has four spaced apart local power range monitors. Each detector is electrically connected for reading the thermal neutron flux in real time and for outputting the state of the reaction within the reactor. It is to be understood that a large reactor can have on the order of 30 to 70 such vertical strings with a total of about 120 to 280 local power range monitors. Such local power range monitors use finite amounts of U235 during their in-service life. Consequently, the sensitivity changes with exposure and they must be periodically calibrated.

Calibration is presently accomplished by using traversing in-core probes (TIPs). These traversing in-core probes are typically withdrawn from the reactor, as the traversing in-core probes are of the same basic construction as the local power range monitors and thus change their sensitivity with in-service life due to uranium 235 burnup.

In operation, the traversing in-core probes are typically calibrated. Such calibration includes inserting about five such probes separately to a common portion of a boiling water reactor. The boiling water reactor is operated at steady state and made the subject of an energy balance of a type well known in the art. The insertion of the traversing in-core probes occurs by placing the probes at an end of a semi-rigid cable and effecting the insertion within a tube system. Once a full core scan has occurred during steady state operation, a heat balance is utilized in combination with the readings of the traversing in-core probes to calibrate the local power range monitors.

In-core probes travel through the reactor in a specially designed tube system. This tube system constitutes through containment conduits into the interior of the reactor vessel. Into these conduits are placed semirigid cables which cables have the TIPs on the distal end thereof. The TIPs are driven into the drive tube system from large drive mechanisms and the entire system is controlled from an electronic drive control unit. The cables pass through so-called "shear valves" which valves can shear the cable and seal the conduit to prevent through the tube system leaks, which leaks may well be substantial before the cable and probes could be withdrawn. The cables further pass through stop valves admitting the traversing in-core probes to the interior of the vessel containment. Finally, the cables reach so-called indexers, and then to the interior of the reactor vessel. These indexers provide a mechanical system for routing each of the TIPs to pass adjacent the site of an assigned segment of the 170 some odd local power range monitors in a large boiling water nuclear reactor. It is normal for an indexer to include 10 alternative paths for a single traversing in-core probe to follow during a calibration procedure.

Needless to say, this system is elaborate and complex. Calibration of each local power range monitor is a function of the probe measurement of the local thermal neutron flux as well as a function of the position of the end of the inserting semi-rigid cable. Naturally, this position of the end of the semi-rigid cable has to be referenced to the proper alternative path for the necessary calibration to occur.

Further, the necessary tube system includes a matrix of tubes below the reactor vessel. Normally these tubes must be removed for required below vessel service and replaced thereafter.

Despite the presence of both stop valves and shear valves, the system remains as a possible escape route for water containing radioactive particles from the reactor. Further, the withdrawn cable can have mechanical complications as well as being radioactive.

For these reasons, it has recently been conceived to omit the use of the TIPs, and use, instead of the TIPs, another type of reactor power measurement apparatus in combination with the LPRM system. This type of apparatus, which is referred to as a gamma thermometer, comprises a system of sensors at a fixed position in the reactor that does not require a drive mechanism, nor does it involve substantial deterioration of sensitivity.

Gamma thermometers are known. In general, the gamma thermometer is a type of reactor power measurement apparatus, which detects the quantity of heat attributable to radiation, and in particular gamma rays. In contrast with a fission ionization chamber, the gamma thermometer does not, in principle, involve sensitivity deterioration.

Referring to FIG. 8, a typical gamma thermometer T is illustrated in a simplistic format. Typically, the gamma thermometer T includes a metal mass 74 suspended in a cantilevered fashion within an outer tube 76. The mass of metal 74 reaches a temperature, which is directly dependent on the gamma ray flux.

A reading thermocouple 78 and a reference thermocouple 80 are utilized in a series circuit. Specifically, the temperature differential between the reference thermocouple 80 (typically referenced to a temperature stable interior portion of the core) and the reading thermocouple 78 produce a voltage on paired lines 82, 84 which voltages indicate the gamma flux present which is proportional to reactor power.

Gamma thermometers are placed at fixed locations within the reactor. Each gamma thermometer requires an electrical connection and readout electronics. Unfortunately, gamma ray output as measured by gamma thermometers does not provide a prompt response to power transients as required for safe operation of the reactor. In addition, gamma thermometers are expensive and the probes and associated cabling occupy a significant amount of space within the reactor. Consequently, gamma thermometers are deployed in limited numbers and provide a coarser map of the reaction rate in the core than the TIP system. Therefore, it would be desirable to overcome the above-mentioned problems associated with gamma thermometers.

BRIEF SUMMARY OF THE INVENTION

In one aspect of the invention, a nuclear reactor comprises a core for containing a reaction within a reactor vessel, and a plurality of instrument guide tubes extending into the core at spaced apart locations, each instrument guide tube permitting insertion and removal of a local power range monitoring string, each string having a plurality of local power range monitors for measuring a thermal neutron flux at a predetermined location within the core and an optical gamma thermometer adjacent a corresponding local power range monitor, each optical gamma thermometer comprising a metal mass having a temperature proportional to a gamma flux within the core and an optical fiber cable that measures the temperature of the metal mass, wherein the optical gamma thermometer is capable of calibrating the corresponding local power range monitor during steady state power operation of the reactor.

In another aspect of the invention, an optical gamma thermometer for measuring a gamma flux in a nuclear reactor having a core, the optical gamma thermometer comprising a metal mass having a temperature proportional to a gamma flux within the core and an optical fiber cable that measures the temperature of the metal mass, wherein the optical gamma thermometer is capable of calibrating a corresponding local power range monitor during steady state power operation of the nuclear reactor.

In yet another aspect of the invention, a method for calibrating a local power range monitor in a nuclear reactor, comprises:

placing at least one optical gamma thermometer adjacent a corresponding local power range monitor;

operating the reactor at a steady state operating condition;

taking an energy balance of the reactor to determine a power output of the reactor;

measuring a temperature of a metal mass of an optical gamma thermometer;

correlating the power output at a portion of the reactor to the temperature measured by the optical gamma thermometer;

taking a reading of the corresponding local power range monitor; and calibrating a neutron flux from the reading of the local power range monitor and the measured temperature of the optical gamma thermometer.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein:

FIG. 7A is a schematic diagram of a system for measuring gamma flux at multiple discrete locations with multiple optical gamma thermometers using a single optical fiber cable according to an embodiment of the invention;

DETAILED DESCRIPTION OF THE INVENTION

Figure 1:
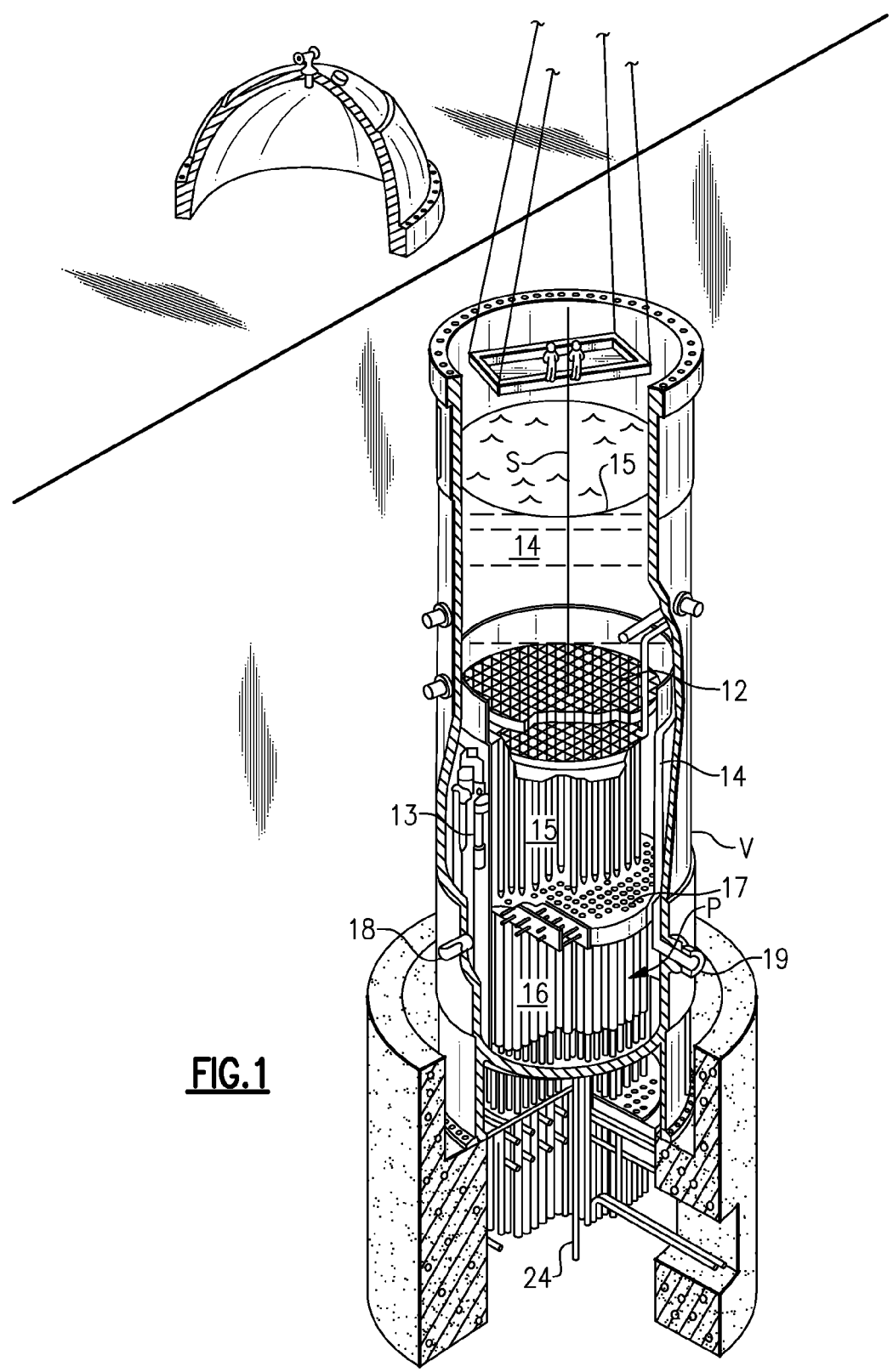
FIG. 1 is a schematic view of a boiling water nuclear reactor illustrating a local power range monitor string with an optical gamma thermometer being installed into an in-core guide tube for determining a gamma flux within the reactor core in accordance with an embodiment of the invention.

Referring to FIG. 1, a reactor vessel V is shown with its dome removed and a local power range monitor string S in the process of insertion. Typically, the string S inserts into tube 24. The tube 24 begins at the core plate 12 and extends through the bottom of the reactor vessel V.

The portion of the string S within the core extends above the tube 24. An upper portion of the string S registers to the top guide 12. Thus, the string S as ultimately held to the core stands vertically upright in measuring exposure to the neutron flux interior of the reactor core.

Referring to FIG. 1, a section of a boiling water reactor vessel V is illustrated. The vessel V includes a core shroud 14 surrounding a core 15 controlled by control rods 16. In the portion of the reactor shown in FIG. 1, one or more jet pumps 13 draw water over the top of a top guide 12 downwardly in the interstitial volume between the side of the vessel V and the core shroud 14 through the jet pumps 13 to a plenum P below the core of the reactor. Water then passes upwardly through a core plate 17 into the individual fuel bundles of the core at 15. Water for the jet pumps is extracted at 19, entered at 18 to cause the required forced circulation within the reactor. Although a boiling water reactor is described herein, it will be understood that the principles of the invention can be used in any type of nuclear reactor in which in-core instrumentation is used.

As shown, a single instrument guide tube 24 is illustrated for the insertion of a local power range monitor string S. It will be understood that insertion begins from above the core 15. The string S is from the top of the core 15 inserted to the bottom of the in-core guide tube 24. A seal is made at the bottom of the in-core guide tube 24. The string extends from the top of the core 15 adjacent the top guide 12. The in-core guide tube 24 can be also designed such that they can be accessed from the bottom of the reactor core 15. Each string S includes typically four monitoring sites. These monitoring sites are equally spaced between the top guide 12 and the core plate 17. They are positioned to sample four successive vertical intervals within the reactor.

Although the illustration of FIG. 1 only shows one such in-core guide tube 24, it will be understood that many are in fact used to monitor a typical core 15. For example, it is not uncommon to include sixty four (64) such instrument guide tubes or about 256 discretely wired local power range monitors.

It should be understood that the local power range monitors are combined in varying groups to produce required measurement. Because the combination of such groups is not pertinent to this invention and because the instrumentation for reading such local power range monitors is well known, such instrumentation will not be further described herein.

Figure 2:
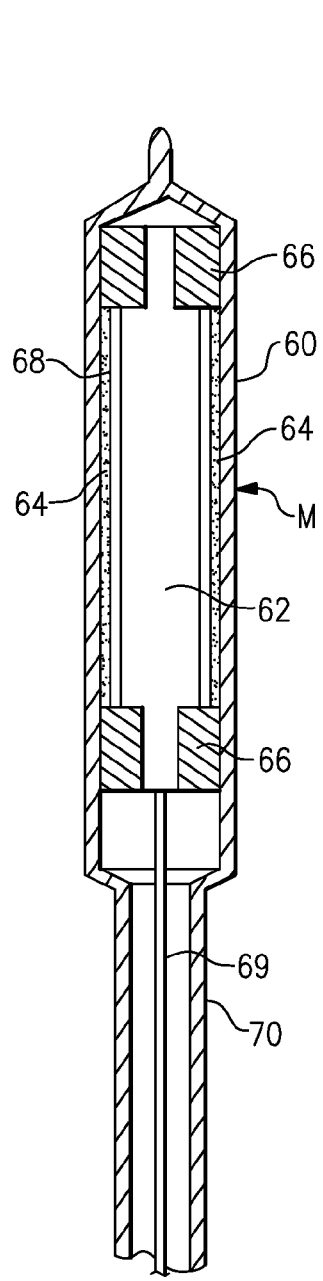
FIG. 2 is an enlarged cross-sectional view of a local power range monitor for installation in the core of a reactor.
Figure 8:
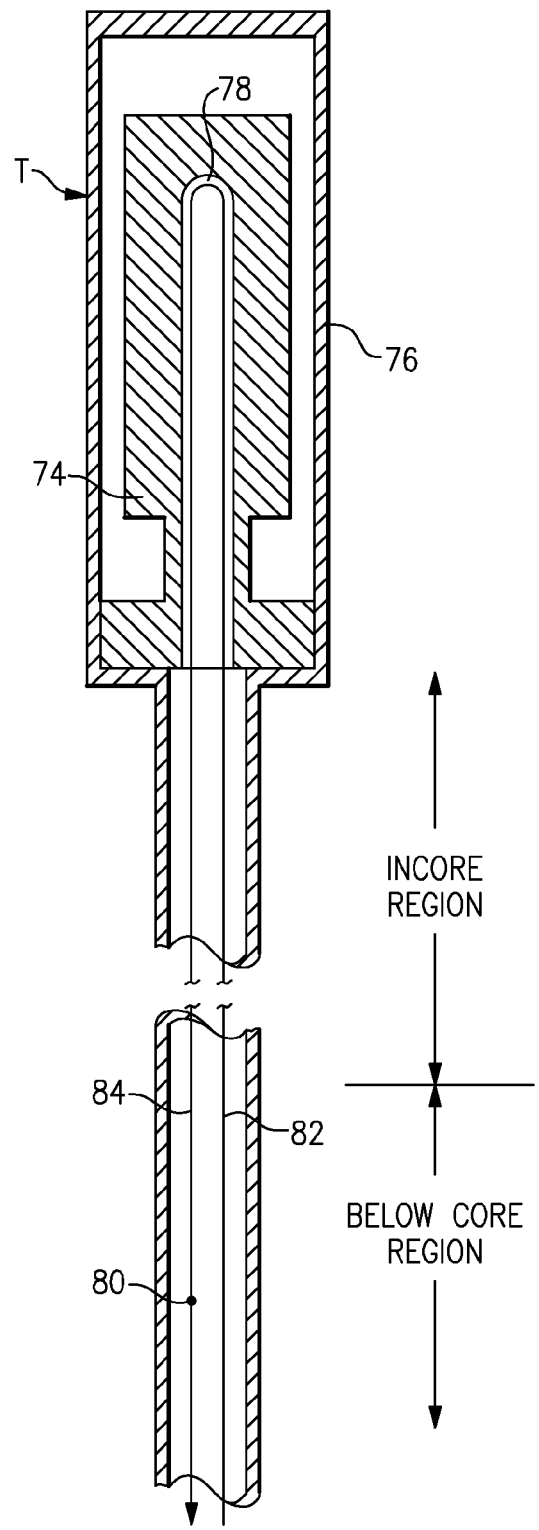
FIG. 8 is a cross-sectional view of a conventional gamma thermometer.

Referring to FIG. 2, a local power range monitor M includes an outer cylindrical cathode 60 and an inner concentric and cylindrical anode 62 housed within an outer tube 70. Cathode 60 adjacent to anode 62 is provided with a thin coating of fissionable materials 64. Materials 64 are typically combinations of U235 and U234. As is well known in the art, U235 is expended over the life of the monitor M; the U234 breeds replacement U235 thus prolonging the in-service life of the detector M.

Typically, anode 62 is mounted by insulating blocks 66 at each end so as to be concentric of the enclosing cathode 60. Preferably, an argon atmosphere 68 is present. Typically a coaxial cable leads from the detector with the center conductor connected to the anode and the outer conductor connected to the cathode. It is the direct current through the cable that provides the real time measurement of thermal neutron flux.

In operation, thermal neutrons impact U235 at layer 64. Fission components dissipate into the argon gas 68 and cause electrons to flow to the anode with ions of opposite polarity to the cathode. An overall direct current is induced through the cable 69 which direct current is conventionally read. Calibration of the local power range monitor M is required because the U235 component of the layer 64 varies with in-service life.

When the string S is inserted into the in-core guide tube 24 within the core 15 and the reactor is operated under steady state operating conditions, gamma thermometers can be utilized to calibrate the local power range monitors M in conjunction with a conventional reactor heat balance. Typically, the gamma thermometers are located in the vicinity of the local power range monitors M within the string S. For example, the string S may contain a total of four (4) power range detectors M at various elevations in the core 15. In one embodiment, one or more gamma thermometers may be located in the vicinity of each power range detector M to provide an indication of the gamma flux at discrete locations within the core 15.

By the expedient of referencing the gamma flux to the output of the heat (energy) balance, calibration of the local power range monitors occurs over their useful in-service life. The required energy balance measuring the power output of a steady state nuclear reactor is well within the state of the art. Once this is known, measurement of the gamma thermometers can all be correlated to the intensity of the reaction at any given point. Because one or two gamma thermometers are located adjacent each and every local power range monitor M, it is thereafter possible to calibrate each local power range monitor M with the readout of its adjacent gamma thermometer.

As described above, the conventional gamma thermometer T measures the temperature of the metal mass 74 by using a reading thermocouple 78 and a reference thermocouple 80. One aspect of the invention is that the temperature of the metal masses 34, 36 is not measured with the reading thermocouple 78 and a reference thermocouple 80, but with a fiber optic sensor. As used herein, a fiber optic sensor is a sensor that uses optical fiber either as the sensing element ("intrinsic sensors"), or as a means of relaying signals from a remote sensor to the electronics that process the signals ("extrinsic sensors").

Figures 3, 3A:
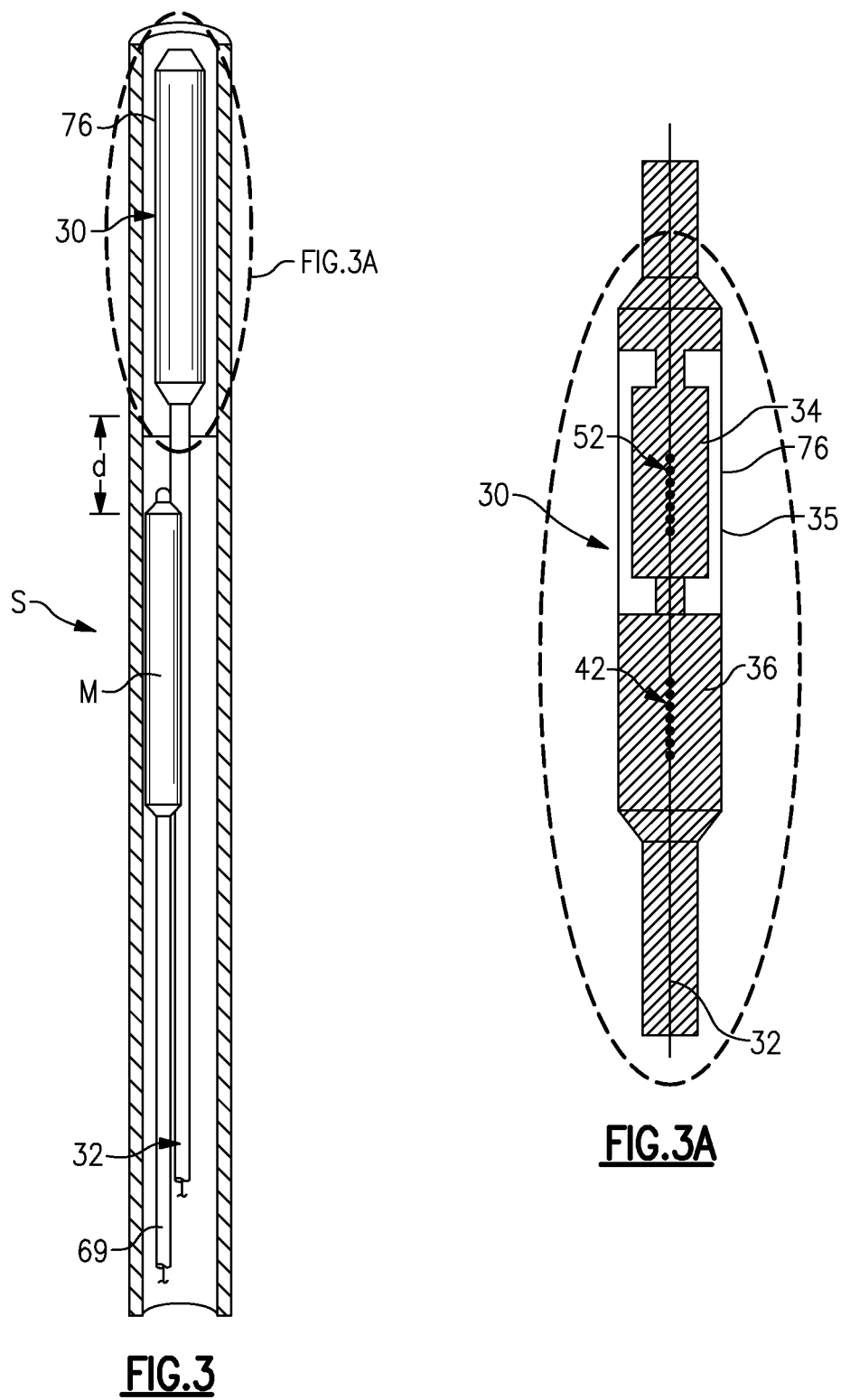
FIG. 3 a cluster of one local power range detector and an optical gamma thermometer in accordance with an embodiment of the invention.
FIG. 3A is an enlarged cross-sectional view of the optical gamma thermometer of FIG. 3.

Referring now to FIG. 3, a portion of the string S that includes an optical gamma thermometer, shown generally at 30, for measuring the gamma flux at discrete locations within the core 15 is shown according to an embodiment of the invention. The string S includes a cover tube having an upward flow of water therethrough. When the optical gamma thermometer is used to calibrate the local power range monitor M, it is desirable that the optical gamma thermometer 30 be located in the vicinity of the local power range monitor M. In the illustrated embodiment, the local power range monitor M is separated from the optical gamma thermometer 30 by a small distance d so that the neutron flux at the local power range monitor M is essentially uniform. For example, the distance d may be about one (1) inch. It will be appreciated that the string S may include a second optical gamma thermometer located on the opposite side of the local power range monitor M that could be separated by the same distance d, or a second distance from the local power range monitor M.

As seen in FIG. 3A, the optical gamma thermometer 30 includes an optical fiber 32 that extends along the length of the string S. In the illustrated embodiment, a single gamma thermometer 30 is shown. However, several gamma thermometers can be located along the single optical fiber 32. The optical gamma thermometer 30 also includes a metal mass 34 that is thermally isolated from the ambient environment and heats in the presence of gamma flux. One way to thermally isolate the metal mass 34 from the ambient environment, for example, is to provide a gap 35 between the metal mass 34 and the outer tube 76. The optical gamma thermometer 30 also includes an optional, second metal mass 36 in thermal contact with the ambient environment that acts as a heat sink to provide a measurement of the ambient temperature to be used as a reference temperature. In an alternative embodiment, the second metal mass 36 can be omitted and the invention can be practiced without the need to measure the ambient temperature.

Figure 4:
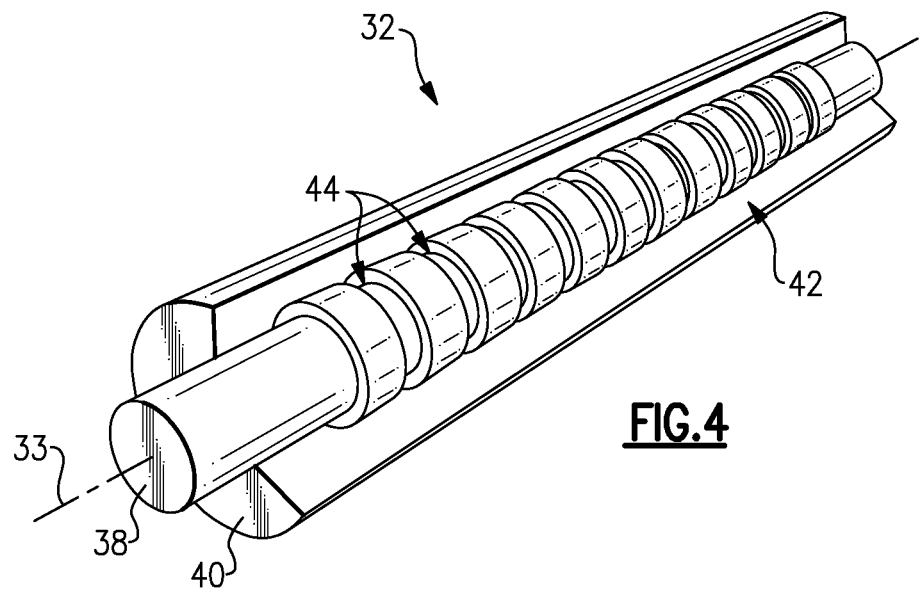
FIG. 4 is partial cross-sectional perspective view of a portion of the optical gamma thermometer according to an embodiment of the invention.

Referring to FIG. 4, the optical fiber cable 32 includes a central fiber core 38 formed of pure or doped silica that extends along a long axis 33 and having a diameter of about 5 microns to about 100 microns. In a particular embodiment, fiber cable 32 includes a periodic modulated refractive index profile along the long axis 33, such as a cosine or Gaussian apodized refractive index profile. A fiber cladding 40 circumferentially covers the fiber core 38 and has an outer diameter of about 125 microns made from pure or doped silica. The fiber core 38 has a higher index of refraction than the fiber cladding 40 such that the fiber cable 32 acts as a waveguide for light propagation. In one embodiment, the fiber core 38 is made of pure silicon dioxide and the fiber cladding 40 is fluorine doped as a single clad fiber sensing cable. In an alternate embodiment, the fiber core 38 is F/GeO$_2$ co-doped, and the fiber cladding 40 is F-doped as a single clad fiber sensing cable. Further, the fiber cladding 40 could be a double clad structure with a first clad lightly F-doped, and a second clad heavily F-doped. The fiber material, either pure silicon dioxide or co-doped tetrahedral O—Si—O structures, has F terminating all dangling bonds and eliminates the OH hydroxyl clusters to maintain the thermal stability and radiation resistance capability of the tetrahedral structure thermal stability.

In one embodiment, a light source (not shown), such as a tunable laser, a superluminescent, light-emitting diode (LED), and the like, is positioned in light emitting communication with the optical fiber cable 32 and emits a near infrared light that propagates through the fiber core 38. It will be appreciated that the invention is not limited by the type of light source, and that the invention can be practiced using any appropriate light source.

Figure 7B:
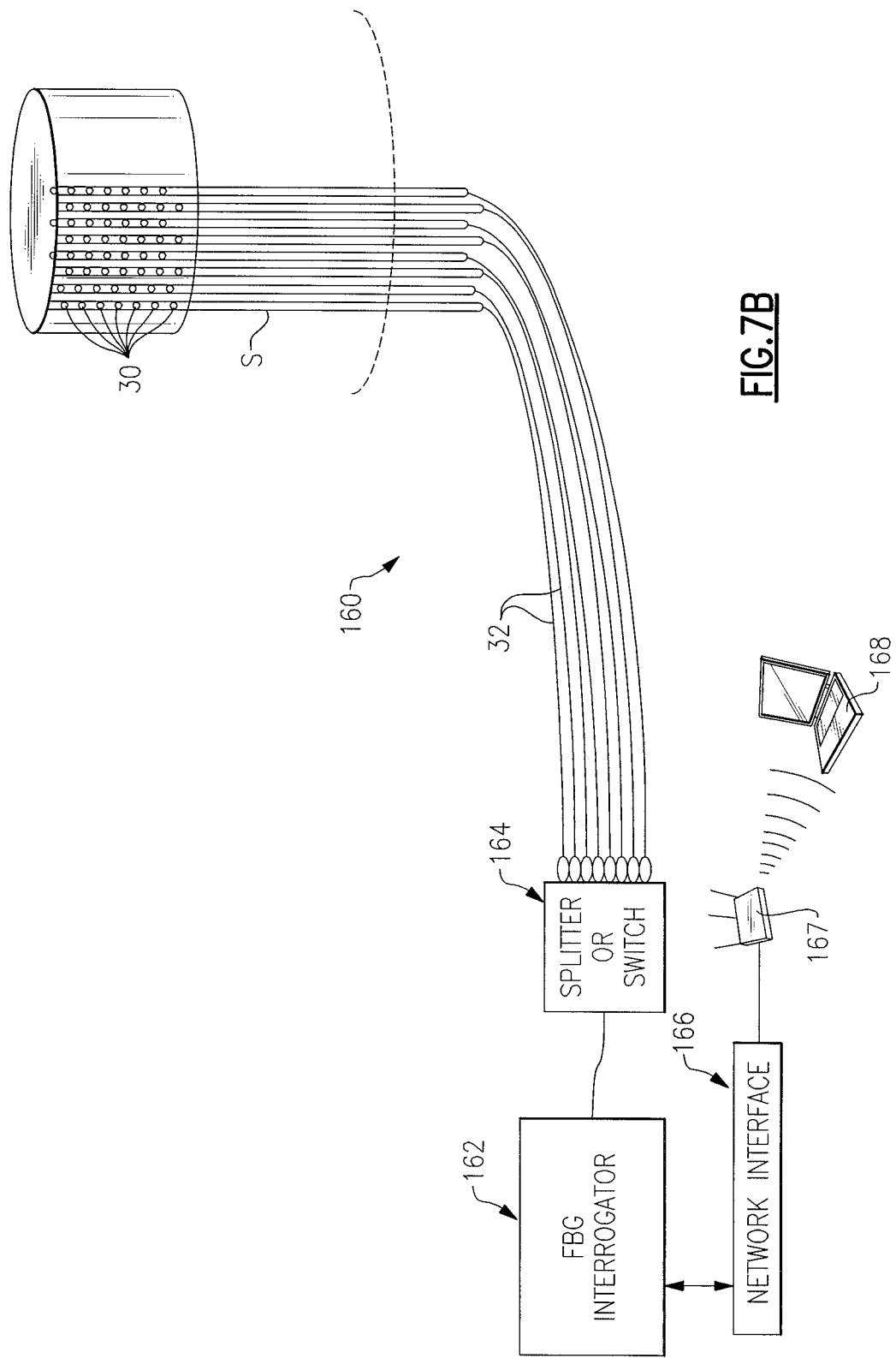
FIG. 7B is a schematic diagram of a system for measuring gamma flux at multiple discrete locations with multiple optical gamma thermometers using multiple optical fiber cables according to an embodiment of the invention.

The light is transmitted or propagated through the fiber core 38 and into a photodetector or interrogator 52 (FIG. 7A). In one embodiment, the optical gamma thermometer 30 includes one or more fiber grating structures 42 that reflect light having a selected wavelength as the light is transmitted through the fiber core 38. In one embodiment, the fiber grating structure 42 comprises a fiber Bragg grating (FBG). The selected wavelength is determined by 2·n·Λ where the n is effective refractive index in the fiber core and the Λ is the grating modulation periodicity. The reflected light wavelength corresponds to a temperature of the metal masses 34, 36. The reflected light signal is transmitted to the photodetector (FIGS. 7A-7C), where the light signal is processed and/or transmitted to a computer (not shown) interfaced and/or communicating with the photodetector. For example, in one embodiment, a wireless interface 167 (FIG. 7B) may transmit electrical signals to the computer in response to light signals received by the photodetector.

In one embodiment, each fiber grating structure 42 has a length along the long axis 33 of the optical fiber cable 32 of about 5 millimeters to about 20 millimeters. In the case where the fiber core 38 is made of pure silicon dioxide and the fiber cladding 40 is a double clad structure, the fiber grating structure 42 can be made from a pure quartz fiber inscribed with high-power femtosecond pulse laser grating inscription technology.

In another embodiment, the fiber grating structure 42 may have a metalized cladding (not shown) surrounding the fiber cladding 40 having a polycrystalline Al, Cu/Ni, or Au coating with a thickness of about 10-20 micrometer. In the illustrated embodiment, the optical gamma thermometer 30 includes two short-period fiber Bragg gratings (FBG) 42. However, the invention can be practiced with any desirable number of FBGs. For example, the invention can be practiced with only one FBG, with three FBGs, and the like. In one embodiment, the FBG 42 has an apodized refractive index modulation along the long axis 33 with a pitch size of about 0.5 microns. It will be appreciated that the invention is not limited to a fiber Bragg grating (FBG) structure, and that the invention can be practiced with other grating structures, such as long period gratings, helical fiber, and the like.

The FBG 42 is configured in a loose packaging arrangement to be effectively free from the effects of strain. In one embodiment, the length of fiber containing one or more FBGs 42 is packaged loosely in a structural cylinder, such that the outer diameter of the fiber cable 32, typically 125 microns, is slightly less than the inner diameter of the structural cylinder, typically around 140 microns. Any strain induced on the package from the outside due to thermal gradients or the mass of the structure will not be transferred to the fiber cable or FBGs. In this way, the optical response of the FBGs will be limited to temperature effects and not strain effects. The optical fiber cable and the FBGs 42 may also be coated with a thin layer of material, such as aluminum, to protect the fiber cable from damage within the structural cylinder. The strain effect on the FBGs 42 due to differences in thermal expansion coefficients between the glass fiber and the coating can be measured or calculated, and factored into the translation between optical wavelength shift and temperature.

Light is reflected at a single wavelength from the fiber Bragg grating structures 42. The reflected signal is a function of material properties and grating structure, such as the index of refraction (n), the grating modulation number N, the normalized mode number V, the grating period Λ, and the grating length $L_G$. The thermal induced wavelength shift, reflected power loss, and Bragg peak resonant width from the FBG 42 can be described as:

$$\Delta\lambda(T) = \lambda_B\left(\frac{1}{n}\frac{\partial n}{\partial T} + \frac{1}{\Lambda}\frac{\partial \Lambda}{\partial T}\right)\Delta T;$$

$$R = \tanh^2\left[\pi\frac{\Delta n L_G}{\lambda_B}\left(1 - \frac{1}{V^2}\right)\right];$$

$$\Delta\lambda = \lambda_B\sqrt{\left(\frac{\Delta n}{2n}\right)^2 + \left(\frac{1}{N}\right)^2}$$

Obviously, the relative wavelength shift is proportional to gamma ray induced temperature change. The parameters $$\frac{1}{n}\frac{\partial n}{\partial T} \text{ and } \frac{1}{\Lambda}\frac{\partial \Lambda}{\partial T}$$

are thermo-optic coefficient and coefficient of thermal expansion, determined by the fiber material properties.

Figure 5:
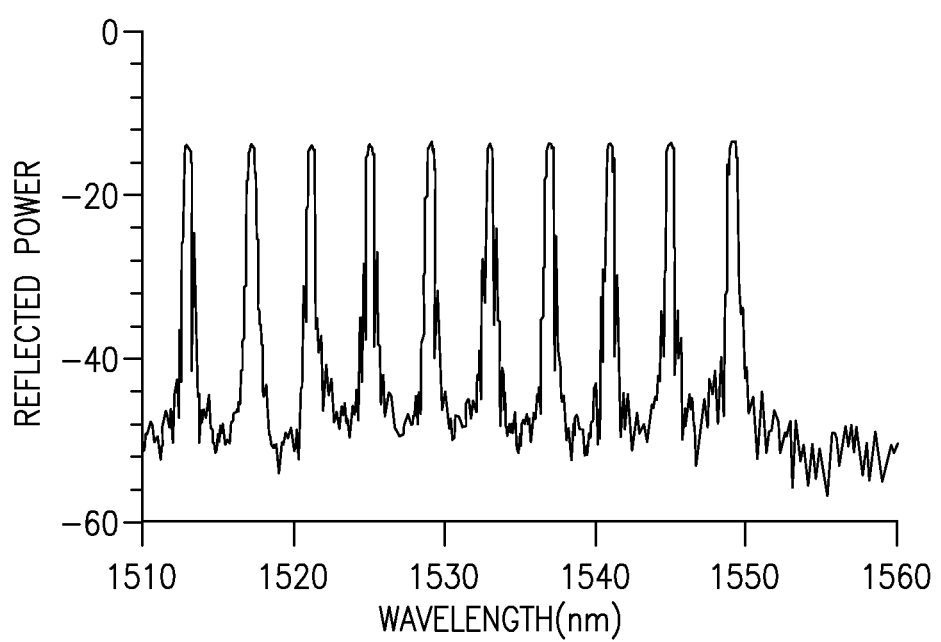
FIG. 5 is a graphical representation of reflected power vs. wavelength for an optical gamma thermometer with a fiber Bragg grating (FBG) structure with ten (10) gratings according to an embodiment of the invention.
Figures 6, 6A:
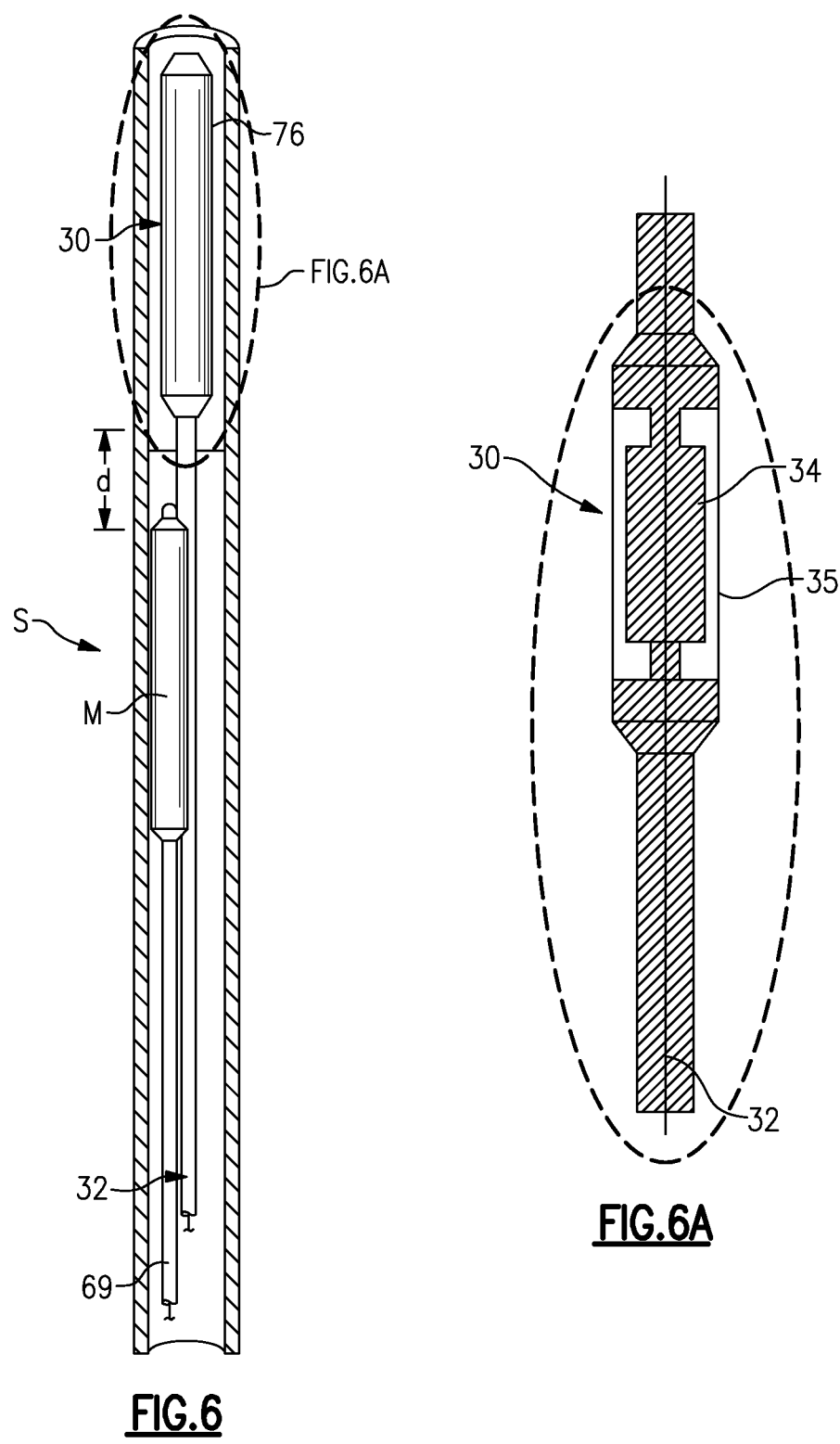
FIG. 6 is cluster of one local power range detector and an optical gamma thermometer in accordance with another embodiment of the invention.
FIG. 6A is an enlarged cross-sectional view of the optical gamma thermometer of FIG. 6.

Referring now to FIG. 5, an example of a reflection response to an optical gamma thermometer with an array of ten (10) fiber Bragg gratings is shown. As shown in FIG. 5, the reflected power is in the range between about −15 dBm to about −50 dBm for wavelengths between about 1510 nm to about 1590 nm. The separation of the peaks varies as a function of the grating period, and the modulation of the center wavelength of each peak is an indication of the gamma flux (or temperature). Temperature resolution is less than 1 degree C.

Optical fiber, by the nature of its material properties, is an ideal distributed temperature sensor. There are several methods available for extracting distributed temperature information from optical fiber. These include techniques based on Raman, Brillouin, and Rayleigh scattering, as well as those involving multiplexed fiber Bragg gratings (FBGs). Techniques based on Raman and Brillouin scattering use time-of-flight (TOF) of optical pulses to resolve position. Due to the limits of how short optical pulses can be made and detected with good noise performance, the systems are thus limited in spatial resolution from about 0.1 m to about 1 m. Methods that employ FBGs can achieve higher resolution, but are often limited by the number of gratings in each fiber. Whenever more than 50 FBGs in each fiber are needed, a multiplexing method, either with an optical coupler/combiner or optical switch, could be used for multiple FGB sensor interrogation. Both FBG-based and scatter-based techniques may require a special optical fiber, for example, a radiation resistant optical fiber, and the like.

Raman scattering allows one to measure temperature. The signal that one obtains is typically a spectrum whose peaks are linearly related to the material symmetry and structural properties. These peaks occur at characteristic intervals that depend on the physical characteristics of the optical phonon vibration, thus producing a fingerprint unique to that material and making this a good method for material analysis. In Raman spectroscopy, that characteristic interval is the frequency shift from the optical phonon vibration modes. This frequency shift is related to the rotational and vibrational components of each phonon excitation energy at the time it encounters the laser, and it appears as a positive shift (Stokes scattering) when the phonons receive energy from the laser and a negative shift (anti-Stokes scattering) when the phonons emit energy. The relative intensity of the Stokes and anti-Stokes peaks depends on the temperature that a system of optical phonon finds itself in, which follows a Boltzmann distribution.

Brillouin scattering occurs when light in a medium (such as water or a crystal) interacts with time dependent density variations and changes its energy (frequency) and path. The density variations may be due to transient dielectric function fluctuations. Whenever the light interaction with transverse and longitude acoustic waves, the scattered light signal also contains Stokes and Anti-Stokes signal components. However, the determination of the temperature is by frequency shift of a specific acoustic wave, or velocity variation from transverse or longitude wave. For isotropic fiber material, the velocity of the transverse and longitude is determined by $(C_{44}/\rho)^{1/2}$ and $(C_{11}/\rho)^{1/2}$ where $C_{11}$ and $C_{44}$ are the elastic module and $\rho$ is fiber material mass density. The determination of the temperature is by the measured velocity or frequency shift.

The inelastic scattering process of Brillouin light scattering is in principle the same as Raman scattering. Historically, Brillouin scattering denominates the scattering of acoustic phonons, while Raman scattering refers to the scattering from molecule vibrations and optic phonons. Nowadays, the difference between Brillouin scattering and Raman scattering is considered to lie in the different experimental techniques and the resulting different available frequency range. The term Brillouin scattering labels an experimental detection of the frequency shift with an interferometer, while Raman scattering labels a setup employing a grating spectrometer. Brillouin scattering is technically limited to the detection of quasiparticles with frequencies below about 500 GHz, while with Raman scattering much higher frequencies in the THz range can be measured.

For intense beams travelling in a medium, such as an optical fiber, the variations in the electric field of the beam itself may produce acoustic vibrations in the medium via electrostriction. The beam may undergo Brillouin scattering from these vibrations, usually in opposite direction to the incoming beam, a phenomenon known as stimulated Brillouin scattering (SBS). Typical frequency shifts of longitudinal and transverse acoustic modes are of the order of about 20-50 GHz. Stimulated Brillouin scattering is one effect by which optical phase conjugation can take place.

For all above sensing methods, either based on FBGs or on fiber itself, the fiber sensing cable requires specialty fiber material that can strongly resist high-energy particles or quasi-particles damage such as gamma-ray, neutrons, and alpha and beta rays etc. The required single mode or multi-mode fibers are composed of fiber core, either pure silicon dioxide or doped silicon dioxide, fiber cladding, either pure silicon dioxide when the fiber core is co-doped with dopant such as $F/GeO_2$ or doped with fluorine when the fiber core is pure silicon dioxide. In one embodiment, such a fiber is composed of pure silicon dioxide core of 4-62.5 μm in diameter, and fluorine doped fiber cladding of 125 μm in diameter. In the other embodiment, the fiber cladding is made of two cladding structures. First cladding is about 24-30 μm for single mode fiber and 82.5 μm for multimode fiber with light fluorine doping concentration; second cladding area, from above cladding diameter to 125 μm, has a higher fluorine doping concentration so that the refractive index profile of the fiber is reduced at from $10^{-4}$ to $10^{-2}$ for reduced transmission loss.

The fiber material, silicon dioxide, is preferred to have condensed, tetrahedral O—Si—O structures such that the dangling bonds are terminated mainly by fluorine. The impurity levels in the fiber material band-gap have to be eliminated such as by a thermal annealing process that effectively enlarges the doped fiber material band-gap. Preconditioning suppresses the carriers from transporting between the covalence and conduction bands, thereby minimizing any changes in conductivity or refractive index. On the other hand, the substitution of the O—Si—OH bond by O—Si—F could eliminate the OH hydroxyl clusters, which can cause fiber darkening.

Because a metalized coating layer, such as Al, Cu/Ni, Au, is used for hermetical sealing and package, its loose microstructure has to be modified to have polycrystalline morphology through thermal annealing at elevated temperature for certain time. The desired temperature for the fiber pre-conditioning process is less than 400° C. for Al coated fiber and fiber sensors, and less than 500° C. for Cu/Ni, and less than 700° C. for Au coating. The desired time should be longer than 24 hours in an inert environment.

Referring now to FIG. 7A, a system, shown generally at 150, for determining a gamma flux with multiple optical gamma thermometers 30 at multiple, discrete locations in the reactor core 15 from a single optical fiber cable 32, is shown. For example, the string S may have eight (8) optical gamma thermometers 30 at discrete locations along the optical fiber cable 32. The system 150 includes an interrogator, shown generally at 152, in optical communication with an optical fiber cable 32. In this embodiment, the optical gamma thermometers 30 include the fiber Bragg grating structure 42 to measure the temperature of the metal mass 34 and/or 36 at discrete locations in the reactor core 15. The interrogator 152 includes a light source 154 and a light receiver 156, and a processor and communications unit 158. An optical coupler or circulator 159 receives the light transmitted from the light source 154 and transmits a portion of the light through fiber core 38 of the optical fiber cable 32. The light detector 156 receives the light reflected from the optical gamma thermometers 30 through the optical coupler or circulator 159. The processor 158 receives a signal of the reflected light from the light detector and processes the signal in accordance with techniques known in the art.

Referring now to FIG. 7B, a system, shown generally at 160, for determining a gamma flux with multiple optical gamma thermometers 30 at multiple locations in the reactor core 15 from multiple optical fiber cables 32, is shown. For example, the system 160 may include sixty-four (64) strings S having eight (8) optical gamma thermometers 30 in each string S. Similar to the embodiment shown in FIG. 7A, the optical gamma thermometers 30 include the fiber Bragg grating structure 42 to measure the temperature of the metal mass 34 and/or 36 at discrete locations in the reactor core 15. The system 160 includes an interrogator, such as a FBG interrogator, shown generally at 162, in optical communication with an optical splitter or switch 164. Similar to the interrogator 152 shown in FIG. 7A, the interrogator 162 includes a light source 154 and a light receiver 156, and a processor and communications unit 158. The interrogator 162 is in communication with a Network interface 166 for transmitting data to a processor 168, such as a laptop computer, and the like. The Network interface 166 can also transmit to a wireless interface 167 for wireless transmission to the processor 168.

Figure 7C:
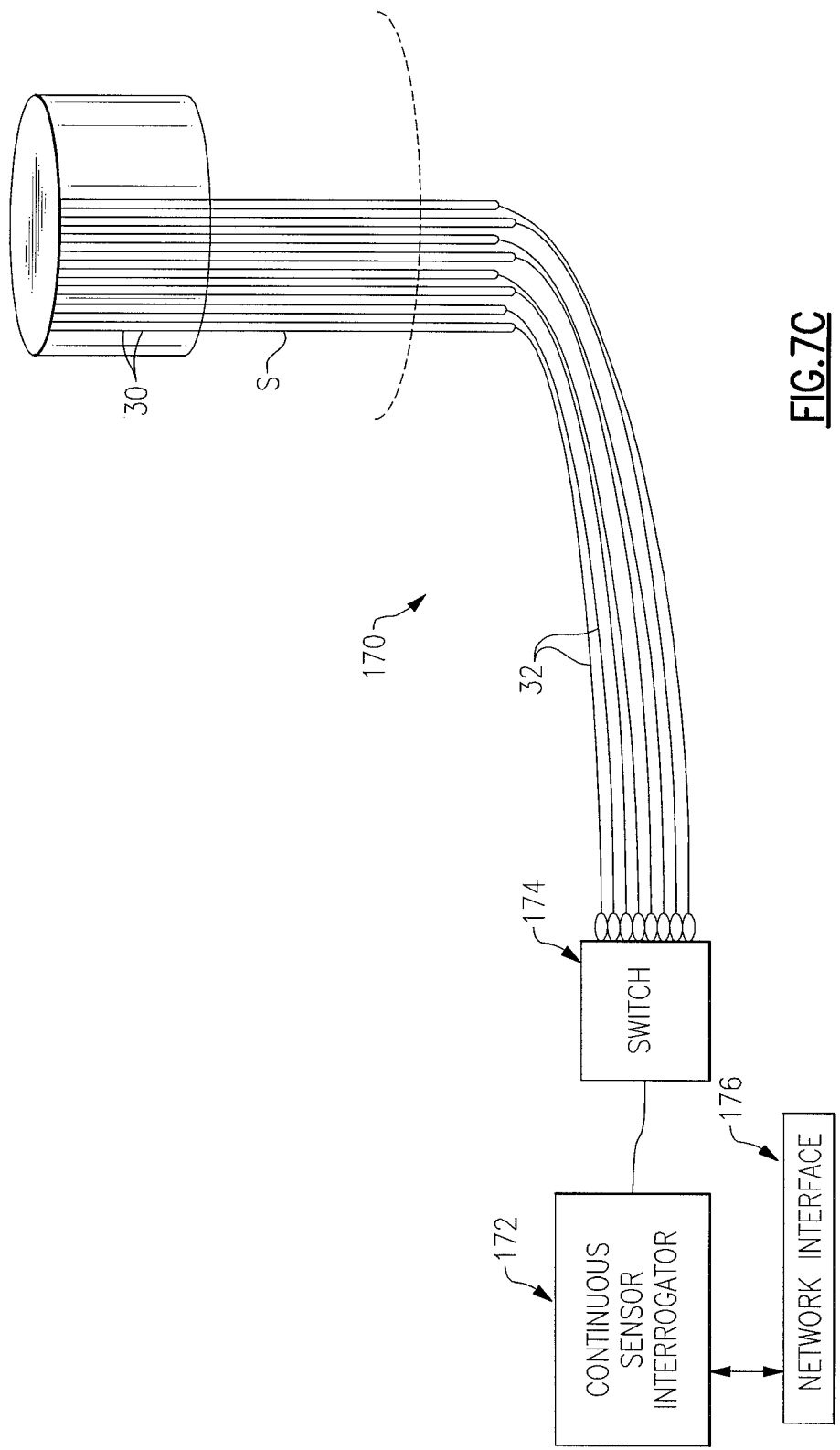
FIG. 7C is a schematic diagram of a system for measuring gamma flux continuously along the length of multiple optical fiber cables according to an embodiment of the invention.

Referring now to FIG. 7C, a system, shown generally at 170, for determining a gamma flux with multiple optical gamma thermometers 30 at multiple locations in the reactor core 15 from multiple optical fiber cables 32, is shown. Unlike the embodiments shown in FIGS. 7A, 7B, the optical gamma thermometers 30 do not include the fiber Bragg grating structure 42 to measure the temperature of the metal mass 34 and/or 36, but measure the temperature continuously along the length of the optical fiber cable 32 in the reactor core 15. A continuous sensor interrogator 172 is in optical communication with an optical switch 174. Similar to the interrogator 52 shown in FIG. 7A, the interrogator 172 includes a light source 154 and a light receiver 156, and a processor and communications unit 158. Similar to the interrogator 162 shown in FIG. 7B, the interrogator 172 is in communication with a Network interface 176, which in turn, may be in communication with a wireless transmitter 167 for transmitting data to a processor 168, such as a laptop computer, and the like.

It will be appreciated that the optical gamma thermometer of the invention does not include portions thereof, which, with increased in-service life, have decreasing effectiveness. This being the case, it will be understood that with reference to any heat balance, the expectancy is that the output of the optical gamma thermometers 30 will remain substantially unchanged.

As described above, the optical gamma thermometer of the invention can provide a measurement of the temperature as a result of gamma flux in an in-core instrument tube using a single optical fiber cable, rather than with the several cables that are required with the conventional gamma thermometer that uses thermocouples to measure temperature. As a result, the optical gamma thermometer of the invention occupies much less space within the in-core instrument tube and costs much less than the conventional gamma thermometer. In addition, a larger number of temperature measurements in a single optical fiber cable are possible, providing a much more accurate three-dimensional temperature map (gamma flux) of the reactor core.

Further, the optical gamma thermometer can be used to calibrate computer simulations relating to the depletion of nuclear fuel during a fuel cycle to better optimize refueling plans. Even further, loose tube packaging of the optical gamma thermometer of the invention with a fiber Bragg grating (FBG) helps eliminate false readings due to the effects of strain. Still even further, a system using the optical gamma thermometer of the invention can replace the conventional TIP system to significantly reduce cost.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. An optical gamma thermometer, comprising:
   an outer tube;
   a metal mass disposed within the outer tube in such a way that the metal mass is thermally isolated from an ambient environment, the metal mass having a temperature proportional to a gamma flux within a core of a nuclear reactor; and
   an optical fiber cable at least partially disposed within the outer tube for measuring the temperature of the metal mass without using a thermocouple, the optical fiber cable having a fiber core extending along a long axis and a fiber cladding circumferentially covering the fiber core, wherein the fiber optical cable further includes a fiber Bragg grating having a periodic refractive index modulation profile along the long axis.

2. The optical gamma thermometer according to claim 1, further comprising a plurality of fiber Bragg gratings, wherein a spacing between each fiber Bragg grating is between about 2 millimeters to about 10 centimeters.

3. The optical gamma thermometer according to claim 2, further comprising a metalized coating layer having a thickness between about 10 micrometers to about 20 micrometers.

4. The optical gamma thermometer according to claim 1, wherein the fiber Bragg grating has a length along a long axis of the optical fiber cable of about 5 millimeters to about 20 millimeters.

5. The optical gamma thermometer according to claim 1, wherein the fiber core is made of pure silicon dioxide and the fiber cladding is fluorine doped to form a single clad fiber sensing cable.

6. The optical gamma thermometer according to claim 1, wherein the fiber core is $F/GeO_2$ co-doped and the fiber cladding is F-doped to form a single clad fiber sensing cable.

7. The optical gamma thermometer according to claim 1, wherein the fiber cladding comprises a double clad structure having a first clad area that is lightly F-doped and a second clad area that is heavily F-doped.

8. The optical gamma thermometer according to claim 1, wherein the temperature is measured by using one of Raman, Brillouin and Rayleigh scattering techniques.

9. The optical gamma thermometer according to claim 1, wherein the optical gamma thermometer includes a second metal mass in direct contact with an ambient environment to provide a reference temperature.

10. A nuclear reactor comprising a core for containing a reaction within a reactor vessel, and a plurality of instrument guide tubes extending into the core at spaced apart locations, each instrument guide tube permitting insertion and removal of a local power range monitoring string, each string comprising a plurality of local power range monitors for measuring a thermal neutron flux at a predetermined location within the core and an optical gamma thermometer adjacent a corresponding local power range monitor, each optical gamma thermometer comprising an outer tube, a metal mass disposed in the outer tube in such a way that the metal mass is thermally isolated from an ambient environment, the metal mass having a temperature proportional to a gamma flux within the core, and an optical fiber cable at least partially disposed within the outer tube for measuring the temperature of the metal mass without using a thermocouple, the optical fiber cable having a fiber core extending along a long axis and a fiber cladding circumferentially covering the fiber core, wherein the fiber optical further includes a fiber Bragg grating having a periodic refractive index modulation profile along the long axis, and wherein the optical gamma thermometer is capable of calibrating the corresponding local power range monitor during steady state power operation of the reactor.

11. The reactor according to claim 10, wherein the optical gamma thermometer includes a second metal mass in intimate contact with an ambient environment for providing a reference temperature.

\* \* \* \* \*